(12) United States Patent
Intrater (10) Patent No.: US 10,613,763 B2
(45) Date of Patent: Apr. 7, 2020

(54) MEMORY DEVICE HAVING MULTIPLE READ BUFFERS FOR READ LATENCY REDUCTION

(71) Applicant: Adesto Technologies Corporation, Santa Clara, CA (US)

(72) Inventor: Gideon Intrater, Sunnyvale, CA (US)

(73) Assignee: Adesto Technologies Corporation, Santa Clara, CA (US)

( * ) Notice: Subject to any disclaimer, the term of this patent is extended or adjusted under 35 U.S.C. 154(b) by 98 days.

(21) Appl. No.: 15/464,514

(22) Filed: Mar. 21, 2017

(65) Prior Publication Data

US 2017/0308306 A1 Oct. 26, 2017

Related U.S. Application Data

(60) Provisional application No. 62/325,813, filed on Apr. 21, 2016.

(51) Int. Cl.

| | |
|---|---|
| *G06F 12/00* | (2006.01) |
| *G06F 13/00* | (2006.01) |
| *G06F 13/28* | (2006.01) |
| *G06F 3/06* | (2006.01) |
| *G06F 12/02* | (2006.01) |
| G06F 12/0868 | (2016.01) |
| G06F 8/41 | (2018.01) |
| G06F 12/0862 | (2016.01) |

(52) U.S. Cl.
CPC .......... *G06F 3/0611* (2013.01); *G06F 3/0656* (2013.01); *G06F 12/0215* (2013.01); *G06F 3/0659* (2013.01); *G06F 8/4442* (2013.01); *G06F 12/0246* (2013.01); *G06F 12/0862* (2013.01); *G06F 12/0868* (2013.01); *G06F 2212/1024* (2013.01); *G06F 2212/7203* (2013.01)

(58) Field of Classification Search
CPC ... G06F 3/0656; G06F 8/4442; G06F 12/0862
USPC ........................................................ 711/126
See application file for complete search history.

(56) References Cited

U.S. PATENT DOCUMENTS

| | | |
|---|---|---|
| 6,321,315 B1 | 11/2001 | LaBerge |
| 7,562,180 B2 | 7/2009 | Gyl et al. |
| 7,593,263 B2 | 9/2009 | Sokolov et al. |
| 8,806,071 B2 | 8/2014 | Zitlaw |
| 8,966,151 B2 | 2/2015 | Zitlaw |

(Continued)

*Primary Examiner* — Edward J Dudek, Jr.
*Assistant Examiner* — Sidney Li
(74) *Attorney, Agent, or Firm* — Michael C. Stephens, Jr.

(57) ABSTRACT

A memory device can include: a memory array arranged to store data lines; an interface that receives a first read command requesting bytes of data in a consecutively addressed order from a starting byte; a cache memory having a first buffer storing a first data line including the starting byte, and a second buffer storing a second data line, from the cache memory or the memory array; output circuitry that accesses data from the first buffer, and sequentially outputs each byte from the starting byte through a highest addressed byte of the first data line; and from the second buffer and sequentially outputs each byte from a lowest addressed byte of the second data line until the requested bytes of data have been output in order to execute the first read command, the contents of the first and second buffers being maintained in the cache memory.

20 Claims, 8 Drawing Sheets

(56) References Cited

U.S. PATENT DOCUMENTS

| | | | |
|---|---|---|---|
| 9,454,421 B2 | 9/2016 | McClain et al. | |
| 2002/0013887 A1* | 1/2002 | Ting | G06F 12/121 |
| | | | 711/160 |
| 2004/0260909 A1* | 12/2004 | Lee | G06F 12/0862 |
| | | | 711/213 |
| 2005/0078506 A1* | 4/2005 | Rao | G11C 11/4076 |
| | | | 365/154 |
| 2005/0141715 A1* | 6/2005 | Sydir | G06F 9/5033 |
| | | | 380/255 |
| 2007/0038799 A1* | 2/2007 | Hummel | G06F 12/1027 |
| | | | 711/3 |
| 2008/0201548 A1* | 8/2008 | Przybylski | G06F 13/4243 |
| | | | 711/171 |
| 2010/0124102 A1 | 5/2010 | Lee et al. | |
| 2014/0029369 A1* | 1/2014 | Yamazaki | G11C 16/10 |
| | | | 365/230.03 |
| 2015/0143020 A1 | 5/2015 | Ferreira et al. | |

* cited by examiner

MEMORY DEVICE HAVING MULTIPLE READ BUFFERS FOR READ LATENCY REDUCTION

RELATED APPLICATIONS

This application claims the benefit of U.S. Provisional Application No. 62/325,813, filed Apr. 21, 2016, and which is incorporated herein by reference in its entirety.

FIELD OF THE INVENTION

The present invention generally relates to the field of semiconductor devices, and more particularly to control and arrangement of memory devices in order to reduce read latency.

BACKGROUND

Non-volatile memory (NVM) is increasingly found in applications, such as solid-state hard drives, removable digital picture cards, and so on. Flash memory is the predominant NVM technology in use today. However, flash memory has limitations, such as a relatively high power, as well as relatively slow operation speed. In addition, microprocessor performance can be very sensitive to memory read latency. Many non-volatile memory devices have an access time or latency that is relatively slow, as compared to that of the microprocessor. In addition, many implementations of various communication protocols between a microprocessor/host and memory, such as serial peripheral interface (SPI), can add even more latency than may be due to the memory array itself.

DETAILED DESCRIPTION OF EMBODIMENTS

Reference will now be made in detail to particular embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, processes, components, structures, and circuits have not been described in detail so as not to unnecessarily obscure aspects of the present invention.

Some portions of the detailed descriptions which follow are presented in terms of processes, procedures, logic blocks, functional blocks, processing, schematic symbols, and/or other symbolic representations of operations on data streams, signals, or waveforms within a computer, processor, controller, device, and/or memory. These descriptions and representations are generally used by those skilled in the data processing arts to effectively convey the substance of their work to others skilled in the art. Usually, though not necessarily, quantities being manipulated take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, waves, waveforms, streams, values, elements, symbols, characters, terms, numbers, or the like.

Particular embodiments may be directed to memory devices, including volatile memory, such as SRAM and DRAM, and also including non-volatile memory (NVM), such as flash memory devices, and/or resistive switching memories (e.g., conductive bridging random-access memory [CBRAM], resistive RAM [ReRAM], etc.). Particular embodiments can include structures and methods of operating flash and/or resistive switching memories that can be written (programmed/erased) between one or more resistance and/or capacitive states. In one particular example, a CBRAM storage element may be configured such that when a forward or reverse bias greater than a threshold voltage is applied across electrodes of the CBRAM storage element, the electrical properties (e.g., resistance) of the CBRAM storage element can change. In any event, certain embodiments are suitable to any type of memory device, and in particular NVM devices, such as flash memory devices, and may include resistive switching memory devices in some cases.

Figure 1:
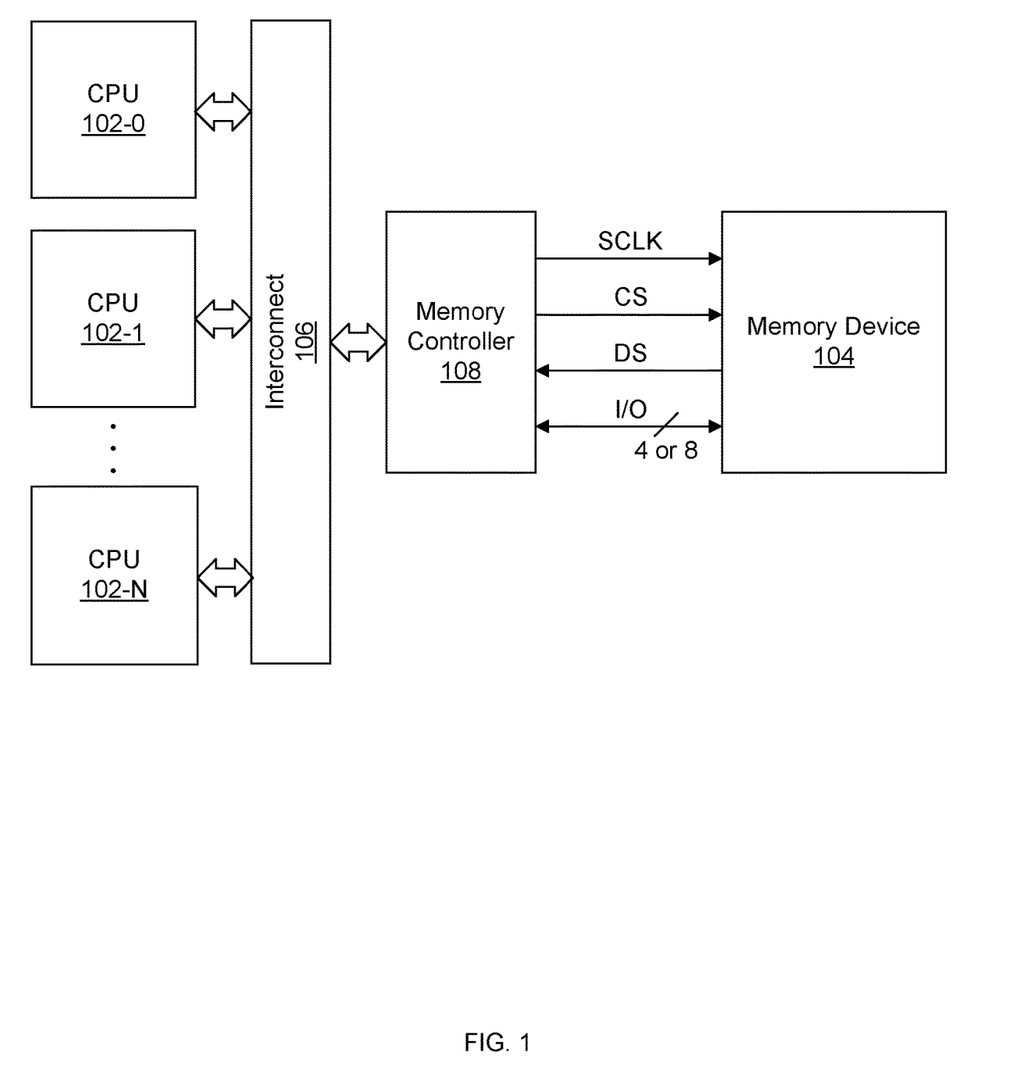
FIG. 1 is a schematic block diagram of an example host and memory device arrangement, in accordance with embodiments of the present invention.

Referring now to FIG. 1, shown is an example memory device and host arrangement 100, in accordance with embodiments of the present invention. In this example, a plurality of CPUs or hosts 102 can interface with memory device 104 via interconnect/bus 106 and memory controller 108 (e.g., SPI host controller) that supports a serial interface. In other cases, a single CPU/host 102 may directly interface with each memory device 104. For example, each CPU/host 102 can be any suitable controller (e.g., CPU, MCU, general-purpose processor, GPU, DSP, etc.), and memory device 104 can be any type of memory device (e.g., SRAM, DRAM, PSRAM, EEPROM, Flash, CBRAM, magnetic RAM, ReRAM, etc.). Memory device 104 can thus be implemented in a variety of memory technologies, such as non-volatile types. In some cases, memory device 104 can be a serial flash memory that may be implemented in more traditional non-volatile memories, or in CBRAM/ReRAM resistive switching memories.

Various interface signals, such as in a serial peripheral interface (SPI), can be included for communication between CPUs 102 and memory device 104. For example, serial clock (SCK or SCLK) can provide a clock to device 104, and may be used to control the flow of data to the device. Command, address, and input data (e.g., via I/O pins) can be latched by memory device 104 on a rising edge of SCK, while output data (e.g., via I/O pins) can be clocked out of memory device 104 by SCK or data strobe (DS). Chip select (CS), which may be active low, can be utilized to select memory device 104, such as from among a plurality of such memory devices sharing a common bus or circuit board, or otherwise as a way to access the device. When the chip select signal is de-asserted (e.g., at a high level), memory device 104 can be deselected, and placed in a standby mode. Activating the chip select signal (e.g., via a high to low transition on CS) may be utilized to start an operation, and returning the chip select signal to a high state can be utilized for terminating an operation. For internally self-timed operations (e.g., a program or erase cycle), memory device 104 may not enter standby mode until completion of the particular ongoing operation if chip select is de-asserted during the operation.

In the example interface, data can be provided to (e.g., for write operations, other commands, etc.) and from (e.g., for read operations, verify operations, etc.) memory device 104 via the I/O signals. For example, input data on the I/O can be latched by memory device 104 on edges of SCK, and such input data can be ignored if the device is deselected (e.g., when the chip select signal is de-asserted). Data can be output from memory device 104 via the I/O signals as well. For example, data output from memory device 104 can be clocked out on edges of DS or SCK for timing consistency, and the output signal can be in a high impedance state when the device is deselected (e.g., when the chip select signal is de-asserted).

In this example, multiple CPU cores 102 (e.g., 102-0, 102-1, . . . 102-N) can interface by way of the serial interface to memory device 104. Memory requests can be sent in an interleaved fashion such that one of the CPU/hosts 102 has control of the serial interface at a time. As will be discussed in more detail below, the addresses of memory requests from memory device 104 can become non-sequential in cases of execution of a branch, jump, interrupt, or other instruction that might alter the sequential execution, or in cases of interleaved memory requests from multiple CPU cores. For example, one read request may be sent from CPU 102-0 to memory device 104, and a non-sequential or interrupting memory request can be sent from CPU 102-1 to memory device 104. As used herein, "non-sequential" may refer to non-sequential addresses, as opposed to temporal non-sequentiality.

In one embodiment, a memory device can include: (i) a memory array having a plurality of memory cells arranged as a plurality of data lines, where each data line includes a predetermined number of bytes of data; (ii) an interface configured to receive a first read command that requests a plurality of bytes of data in a consecutively addressed order from an address of a starting byte; (iii) a cache memory having first and second buffers, and being configured to store a plurality of data lines; (iv) the first buffer being configured to store a first of the plurality of data lines from the cache memory or the memory array, where the first data line includes the starting byte; (v) the second buffer being configured to store a second of the plurality of data lines from the cache memory or the memory array, where the second data line is consecutively addressed with respect to the first data line; (vi) output circuitry configured to access data from the first buffer, and to sequentially output each byte from the starting byte through a highest addressed byte of the first data line; and (vii) the output circuitry being configured to access data from the second buffer, and to sequentially output each byte from a lowest addressed byte of the second data line until the requested plurality of bytes of data has been output in order to execute the first read command, where the contents of the first and second buffers are maintained in the cache memory.

Figure 2:
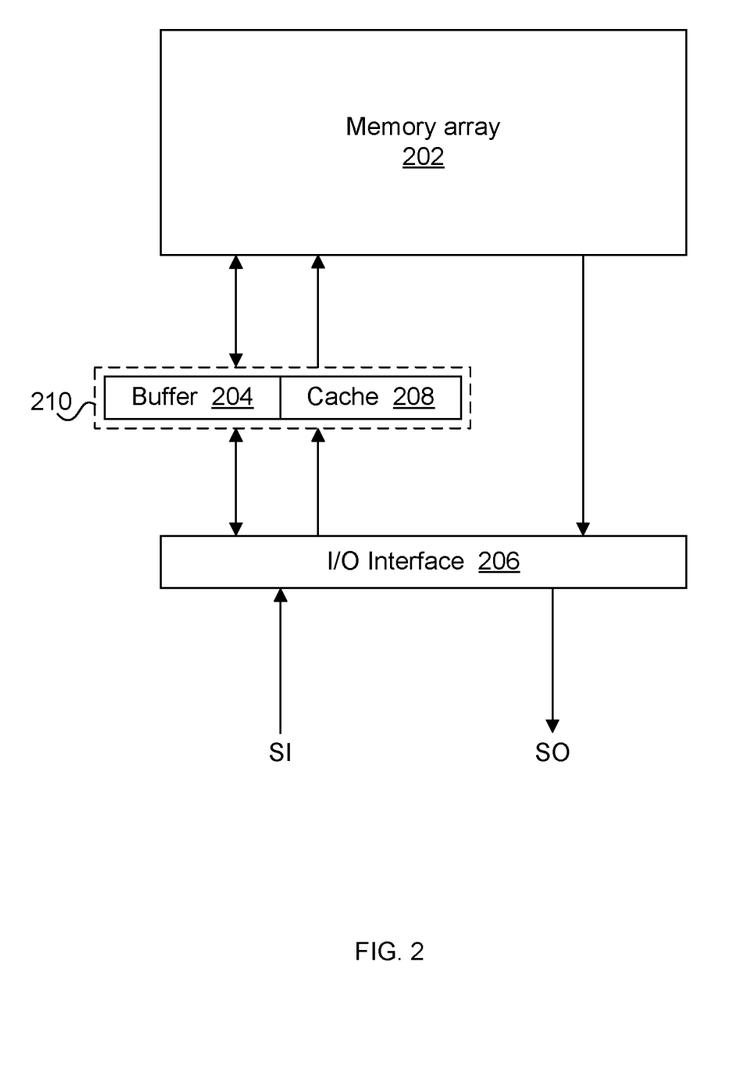
FIG. 2 is a schematic block diagram of an example memory device structure, in accordance with embodiments of the present invention.

Referring now to FIG. 2, shown is a schematic block diagram of an example memory device 104 structure, in accordance with embodiments of the present invention. For example, memory device 104 can include memory array 202, buffer 204 (e.g., SRAM or other fast access memory), and I/O interface 206. In some arrangements, more than one buffer 204 can be provided, such as a buffer for an input path, and another buffer for an output path. Alternatively, or in addition, multiple buffers can be provided for multi-layer buffering. For example, memory device 104 can be configured as a data flash and/or a serial flash device. Memory array 202 can be organized as any suitable number of pages of data. For example, each page can include 256 or 264 bytes of data. Similarly, buffer 204 can store at least a page of data. I/O interface 206 can provide interfacing between memory array 202, buffer 204, and serial data input (SI) and output (SO). For example, I/O interface 206 may be part of an SPI or other serial type of interface, and may also support a number of SPI interface modes (e.g., Single SPI, QPI, and Octal modes).

Data buffer/cache 210 can include one or more of buffers 204, as well as cache memory 208. In some arrangements, the "cache" can include buffers 204, as well as additional buffers, as will be discussed in more detail below (see, e.g., FIG. 5). In one example, buffers 204 can store data that may be accessed by I/O interface 206 for output from the memory device via the serial output, while cache memory 208 (e.g., SRAM or other fast access memory), or one or more of buffers 204, can store data that may facilitate reducing a read latency for upcoming (e.g., non-sequential or interrupting) read requests. In some cases, cache memory 208 can receive the contents of buffer(s) 204, or the given contents can be maintained in one or more of buffers 204, upon completion or interruption (or any type of termination) of a current read operation, and these contents may be accessed from cache memory 208 to support a new read request. Because the new read request can be serviced from cache memory 210 (e.g., including buffers 204) instead of memory array 202, the read latency associated therewith can be reduced.

Figure 3:
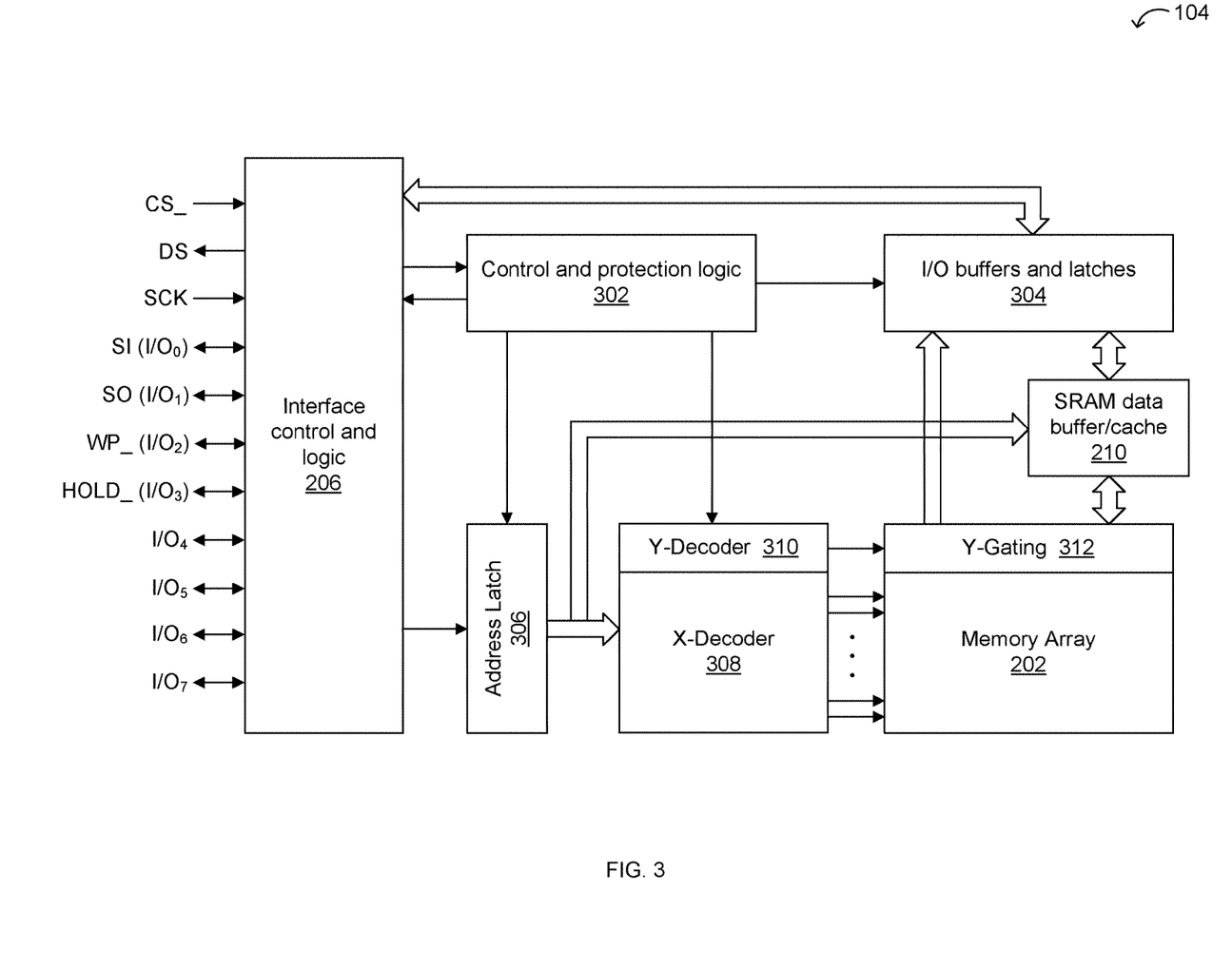
FIG. 3 is a block diagram of an example memory device, in accordance with embodiments of the present invention.

Referring now to FIG. 3, shown is a block diagram of an example memory device, in accordance with embodiments of the present invention. Memory device 104 can include interface control and logic 206, which may manage the interface (e.g., SPI interface), and decode the command and address information. Control and protection logic 302 can include control circuitry for reading and writing to the memory array, including address mapping and control for byte access and group addressing/ordering, as will be discussed in more detail below. For example, control and protection logic 302 can include a command decoder, registers for command execution parameters (e.g., read parameters, program/erase parameters, etc.), as well as a controller for command execution.

I/O buffers and latches 304 can control the input of data from interface control and logic 206, and the output of data to interface control and logic 206. For example, chip select based control and clock based control of data read from memory array 202 can be accommodated via I/O buffers and latches 304. That is, registers/latches in I/O buffers and latches 304 can be controlled by way of the toggling of SCK during burst reads and sequential fetch operations, as described herein. SRAM data buffer(s)/cache 210 can buffer/store data between memory array 202 and I/O buffers and latches 304. Address latch block 306 can receive address information via interface control and logic 208, and may provide latched addresses to X-decoder 308 for row addresses, to Y-decoder 310 for column addresses, and to SRAM data buffer(s)/cache 210.

The addresses provided from address latch 306 to SRAM data buffer/cache 210 may be used to search for a match/hit or miss of the requested data from memory cache 208. Thus, if the requested data is found in buffer/cache 210 via the address matching, the requested data can be directly supplied to I/O buffers and latches 304 for direct outputting, as opposed to accessing that data from memory array 202. Incrementing of addresses can be performed via address latch block 306 and/or control and protection logic 302. Y-decoder 310 can provide column addresses to Y-Gating 312, which can include pass gates or the like to multiplex I/O lines to/from memory array 202. As discussed above, memory array 202 can include an array of volatile memory cells, or non-volatile memory cells (e.g., CBRAM, ReRAM, flash, etc.).

Figure 4:
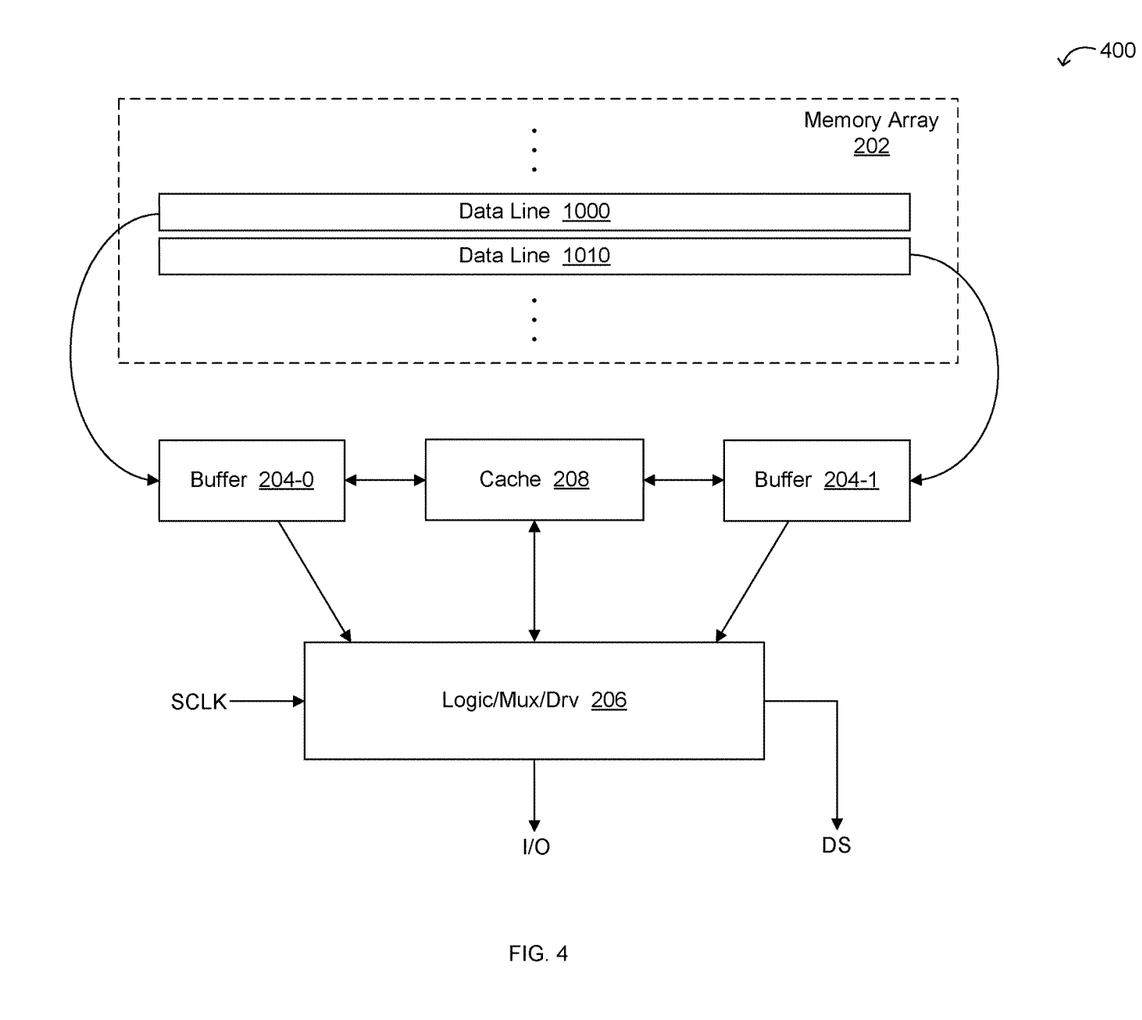
FIG. 4 is a block diagram of an example memory array and buffer arrangement for reading data, in accordance with embodiments of the present invention.

Referring now to FIG. 4, shown is a block diagram of an example memory array and buffer arrangement for reading data, in accordance with embodiments of the present invention. For example, memory device 104 can include memory array 202 (e.g., a flash memory array), buffers 204-0 and 204-1, and cache memory 208, which can be implemented in SRAM or any other relatively fast access memory. In some arrangements, only one or more than two buffers 204 can be provided, such as multiple buffers for multi-layer buffering and deeper pipelining. Memory device 104 can be configured as a data flash and/or a serial flash device, and memory array 202 can be organized as any suitable number or arrangement of pages of data. Also, cache memory 208 may store at least the same amount of data as buffers 204, and in some cases may be many times (e.g., 4, 8, 16, etc.) as much data as buffers 204. In one implementation, a plurality of buffers 204 may effectively form the cache memory by being maintained as if the buffers are lines in a cache memory, and as such a separate cache 208 may not be needed. In any event, data from a read request of memory array 202 can be copied into one or more of buffers 204 as part of the read operation. Output circuitry 206 can receive a clock signal, and may perform various logic, multiplexing, as well as driving functions in order to drive I/O pins (e.g., 4, 8, or any other number of pins) and the optional data strobe pin (DS).

As used herein, a "data line" can be a group of bytes of data, which may include code for in-place execution and/or data otherwise used in code execution, or any other type of stored data. A data line can be a group of consecutively addressed bytes of data that can be accessed from a memory array in one memory access cycle, and which may be output from the memory device over a plurality of output cycles (e.g., 16 cycles, or 8 cycles of double data rate output) of a clock or data strobe. For example, memory cells in a data line may share a common word line and selected bank of sense amplifiers. As one particular example, a data line may be equivalent to a cache line that may be requested to be filled by the host, or a page of data. Also for example, a data line can be 16 bytes of data that are sequentially/consecutively addressed. Further, a data line may represent a boundary such that when one byte within a given data line is requested as part of a read operation, a subsequent memory array access to a next sequentially addressed data line may be utilized in order to bring out a full data line worth (e.g., 16 sequential bytes) of data, starting with the requested byte. Also, in some cases, a data line can also include extra bits, in addition to byte quantities of data.

Thus in many cases, two reads to memory array 202 can occur prior to (e.g., in a pre-fetch), or in parallel with, outputting the data via output circuitry 206. For example, data line 1000 (e.g., 16 bytes=128b) can be accessed from memory array 202, provided to buffer 204-0, and output via output circuitry 206. Then, data line 1010 can be accessed, and provided to buffer 204-1 for outputting via output circuitry 206. As labeled herein, the data lines are identified by way of their example starting byte aligned address in hexadecimal. Thus, "1000" may be the hexadecimal address of the lowest addressed byte of the corresponding data line (i.e., the byte corresponding to the lowest address of the given data line), and "1010" may be the hexadecimal address of the lowest addressed byte of the next sequentially addressed data line, for a 16 byte data line size.

Buffering (e.g., via buffers 204 and cache memory 208) can be utilized to help minimize memory array access latency, and may allow for chunks of 128$b$ (e.g., a data line size) to be output from the memory device every 8 clock cycles. For example, each of buffers 204-0 and 204-1 can store at least 128 b of data. In standard SPI, there may be no way to notify host 102 that buffers 204 may have insufficient data (e.g., less than 128 b of data) that satisfy the present read request (e.g., from the starting address to consecutively addressed bytes for a total of 16 bytes), and increased latency may occur as a result. Thus, 2 entities or data lines can be accessed ahead of time (pre-fetched) in a sequential and ping-ponged fashion, such as data line 1000 being provided to buffer 204-0, followed by data line 1010 being provided to buffer 204-1. This can ensure sufficient buffering in order to meet output clocking requirements for the memory device. In this way, read requests can be issued by host 102, e.g., every 4 or 8 clock (e.g., SCK) cycles, and the streaming out of data (e.g., once buffers 204 sufficiently full) can effectively be sequential with pre-fetching, such as to a 128 b chunk of data every 4 or 8 cycles, depending on the I/O and data line width/size configurations.

In an example operation, if a read request with a particular starting address byte of a 128 b entity (e.g., a data line) is received by the memory device, such data can be output from the memory device, and a request can be sent from the host or implied in order to read out the next sequentially/ consecutively addressed data line. If the read request includes a starting address toward end of a given data line, there may be insufficient data that can be sequentially (e.g., consecutively addressed bytes) accessed from that data line, as will be discussed in more detail below. For example, one such case in which only a single entity or data line need be accessed to satisfy a read request is where the first byte (i.e., the data byte at the lowest address) in a given data line is the starting address. This particular case may have a probability of $1/16$ of occurring for a 16 byte data line size.

However, a read latency bottleneck can occur due to this process of utilizing back-to-back reads from memory array 202. This bottleneck can be due to a requirement that the starting byte address could be any byte (byte-aligned addressing). In order to accommodate all addressing cases, including the extreme case whereby the last byte (i.e., the data byte at the highest address) of the N-bits (e.g., a data line) sensed is requested as the starting byte, and then the first byte of the next N-bits (e.g., the next consecutively addressed data line) may be accessed, two memory array accesses must occur for each read request. In another approach, one or more mode bits can be utilized in order to change to word, double-word, or even line-aligned addressing, which could be used in order to increase the time between the back-to-back reads, and to accordingly reduce the apparent latency of the read operation.

Relatively high read latency can occur where the memory device serves as part of a microprocessor's or host's memory hierarchy, and this latency may have a big impact on the performance of CPU/host 102. In particular, approaches that may be employed in order to reduce the effective latency in a single CPU system may not be quite as feasible in multi-core systems (see, e.g., FIG. 1). This is because, in such a multi-core system, memory requests from the various CPUs may be interleaved, which can result in an increase in the read latency due to the resulting possibly non-sequential and/or interrupting nature of the memory requests.

As discussed above, memory latency can be reduced in many cases by pre-fetching consecutive memory lines (e.g., to buffers 204-0 and 204-1), and providing those data lines to the processor with minimal latency. This approach may operate well when the memory requests from the CPU are for consecutive or sequential memory lines, which is a common case in typical execution of a program on a single CPU/host. However, memory requests could become non-sequential in a number of cases, including during execution of branch, jump, and/or interrupt, or any other instruction that alters the sequential execution, as well as for interleaved memory requests from multiple CPU cores (see, e.g., the arrangement of FIG. 1). In particular embodiments, read latency can be reduced in each such case by employing cache memory 208 in concert with buffers 204, or by simply maintaining the memory lines in buffers 204 for subsequent read operations.

In example memory devices, a pre-fetch of the next consecutive memory lines can occur while sending out the current memory data line from the device. However, in some cases the buffers 204 that hold any next memory data lines may be purged when the current command terminates. This purge can occur even though the host may request data from these memory data lines in follow-on commands. For example, this situation may frequently occur in cases where the commands from multiple cores are interleaved, and/or when a single core returns from a function call. However, in particular embodiments, cache memory 208, or one or more of buffers 204, may store a copy of the contents of buffer(s) 204 when the current read command terminates such that this data may be made available from the cache memory for such follow-on or subsequent commands. In other embodiments, these contents may simply be stored in another of buffer(s) 204 in a cache-like fashion when the current read command terminates such that this data may be made available from buffers 204 for such follow-on or subsequent commands.

Figure 5:
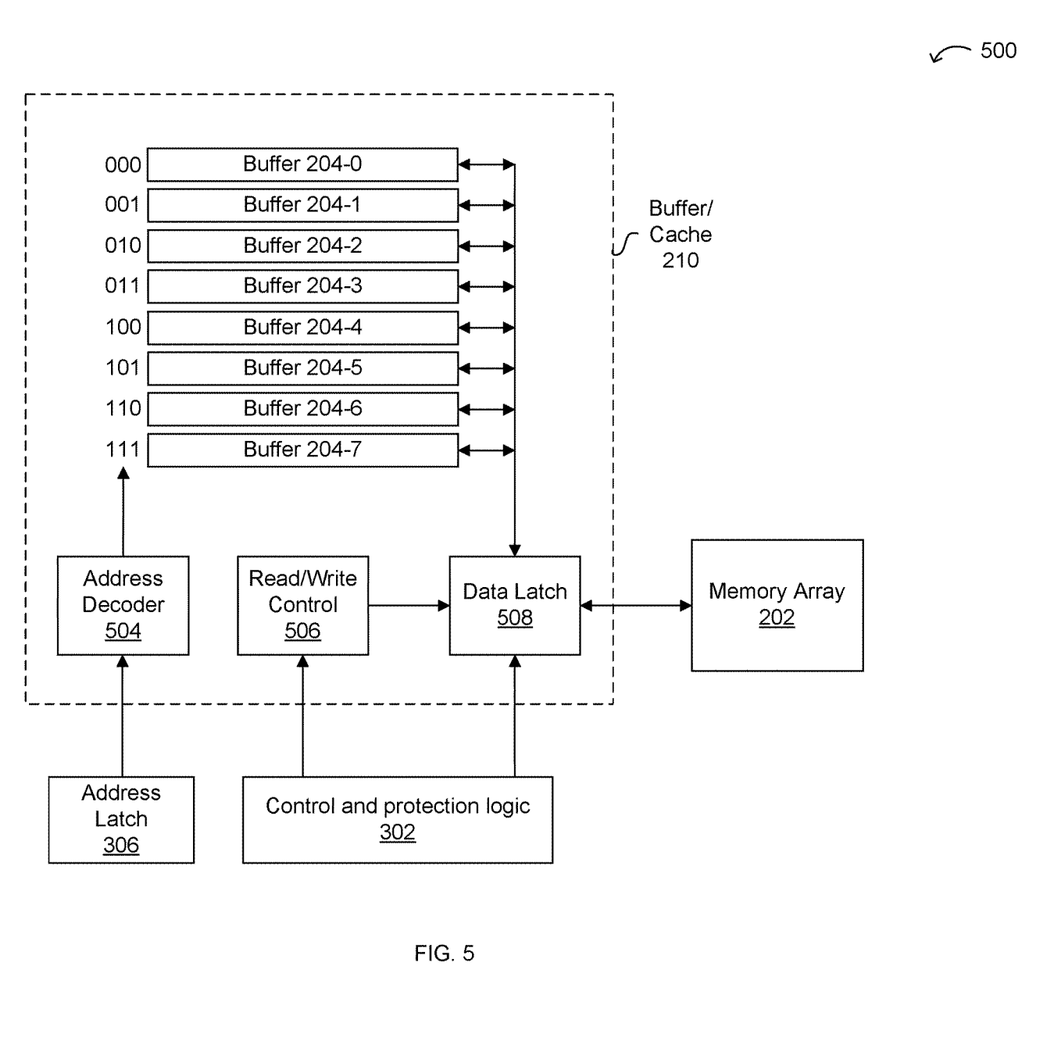
FIG. 5 is a block diagram of an example buffer and cache arrangement in a memory device, in accordance with embodiments of the present invention.

Referring now to FIG. 5, shown is a block diagram 500 of an example buffer and cache arrangement in a memory device, in accordance with embodiments of the present invention. In this example, buffer/cache memory 210 can include eight buffers 204 (e.g., 204-0, 204-1, . . . 204-7). In this way, buffers 204 can be implemented as one or more of buffers 204 to effectively form a cache memory structure. In addition, an address register may be included within, or otherwise be associated with, each of buffers 204 in order to store the address from memory array 202 that corresponds to the contents of the given buffer. For example, such address registers can store the address of the data of memory array 202 that is copied into the given buffer as part of a read operation. Further, a valid bit can also be associated with each address register in order to indicate that the particular address stored therein is valid. Cache memory 210 can also include address decoder 504, which can receive signals from address latch 306, and may provide 3-bit decoded values to address one of eight buffers 204. Read/write control 506 can receive signals (e.g., read control signal, write control signal, etc.) from control and protection logic 302, and may provide a control signal to data latch 508. Data latch 508 can receive signals (e.g., read data strobe, data out enable, load data, etc.) from control and protection logic 302, and may receive or provide the data to/from buffer/cache memory 210. Also, while only eight registers/buffers are shown in the particular example of FIG. 5, any suitable number of registers can be accommodated in particular embodiments.

In certain embodiments, data that is pre-fetched into one or more of buffers 204 can be maintained for future use in buffer/cache structure 210. For example, at the end (either by interruption or completion) of each read command received by the memory device, the data for the next memory lines can be transferred to this cache structure, such as together with their addresses. Upon a new read command, the cache structure 210 may provide the data (e.g., via buffers 204) if the request address (e.g., via address latch 306) equals the address of one of the memory lines stored in the cache. In addition, a replacement algorithm (e.g., a first-in first-out [FIFO] scheme) may be utilized for deciding which cache line (e.g., which of buffers 204) should be replaced when a new line arrives into cache structure 210, as part of "maintaining" the contents of the data buffers in cache structure 210.

Figure 6:
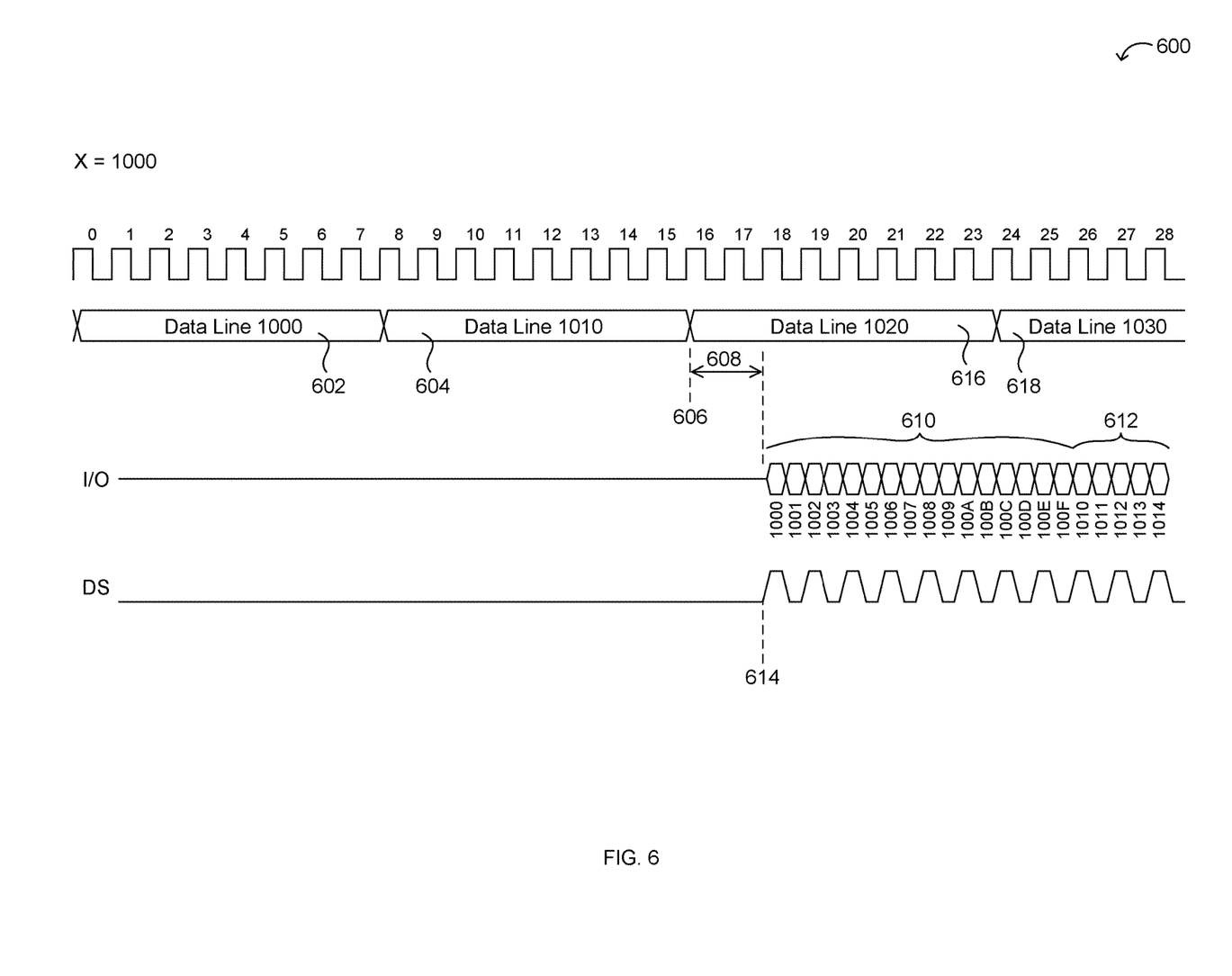
FIG. 6 is a waveform diagram of a first example read transaction, in accordance with embodiments of the present invention.

Referring now to FIG. 6, shown is a waveform diagram of a first example read transaction, in accordance with embodiments of the present invention. In example 600, a starting address "X" can be equal to 1000, and thus may be the first byte (e.g., lowest addressed byte) of data line 1000. Accesses from memory array 202 are shown as access 602 of data line 1000, which can be provided to buffer 204-0, followed by access 604 of data line 1010, which can be provided to buffer 204-1. Thus, buffers 204 can be filled by 606, and a delay 608 can represent access time from buffers 204 through the output via output circuitry 206. For example, data 610 that is output over 8 clock cycles at a double data rate can represent the full data of data line 1000, and data 612 may represent sequentially/consecutively addressed and lower significant byte portions of data line 1010, in order to fill the read request. Thus in this example, 8 I/O lines may output a full data line of 16 bytes of data, and may be strobed out via DS beginning at 614. In addition, other accesses from memory array 202 can include access 616 of data line 1020, and access 618 of data line 1030.

Depending on when the read operation is completed or otherwise terminated by the host, the contents of buffers 204 can be saved either by being copied into a separate cache memory, or by simply being maintained in one of buffers 204. For example, if the read operation completes at the end of a cycle between cycles 21 and 26, one or two data lines (e.g., lines 1000 and 1010) can be saved in cache structure 210 (e.g., in buffers 204). As another example, if the read operation completes at the end of cycle 27, three data lines (e.g., lines 1000, 1010, and 1020) can be saved in cache structure 210 (e.g., in buffers 204). As yet another example, if the read operation completes at the end of a cycle between cycles 28 and 34, three data lines (e.g., lines 1010, 1020, and 1030) can be saved in cache memory 208. In certain embodiments, a predetermined number of data lines, such as those contained in the full contents of buffers 204, can be maintained in buffer/cache structure 210 upon termination of the present read operation. As used herein, the contents being "maintained in" cache memory or structure 210 can include a reallocation of buffers 204, such as by way of FIFO-based cache line management.

Figure 7:
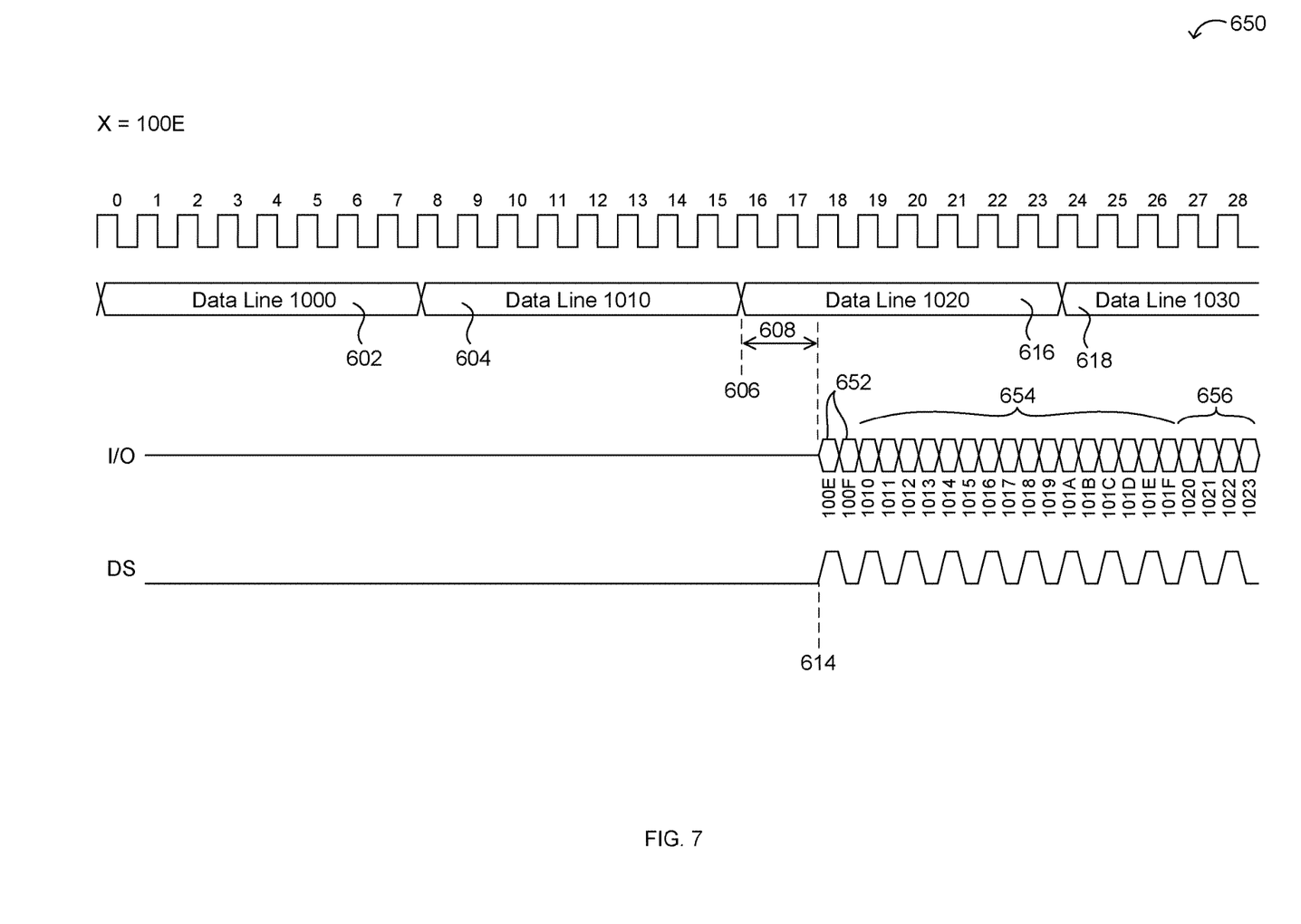
FIG. 7 is a waveform diagram of a second example read transaction, in accordance with embodiments of the present invention.

Referring now to FIG. 7, shown is a waveform diagram of a second example read transaction, in accordance with embodiments of the present invention. While the above example shows a starting byte address of the lowest addressed byte of the data line (e.g., 1000), example 650 shows a starting byte address that is the second to last byte (e.g., highest addressed byte) of the given data line. In this example, data 652 may represent data corresponding to the starting address (e.g., X=100E) contained within data line 1000. Also, data 654 may represent data from the next sequentially/consecutively addressed data line 1010, and data 656 may represent data from a subsequent/sequentially addressed data line 1020. In addition, other accesses from memory array 202 can include access 616 of data line 1020, and access 618 of data line 1030. It should be noted that the data strobe for clocking out the data is activated at 614.

Thus in these examples, the same read latency occurs for a variety of starting addresses of the given data line, including the lowest byte address (X=1000) of FIG. 6, as well as the second highest byte address (X=100E) of FIG. 7. Depending on when the read operation is completed, the contents of buffers 204 can be saved either by being copied into a separate cache memory, or by simply being maintained in one of buffers 204. For example, if the read operation completes at the end of a cycle between cycles 22 and 26, one data line (e.g., line 1010) can be saved in cache structure 210 (e.g., in buffers 204). As another example, if the read operation completes between cycles 27 and 28, two data lines (e.g., lines 1010 and 1020) can be saved in cache structure 210 (e.g., in buffers 204). As yet another example, if the read operation completes at the end of a cycle between cycles 29 and 34, two data lines (e.g., lines 1020 and 1030) can be saved in cache memory 208. In certain embodiments, a predetermined number (e.g., 2, 3, etc.) of data lines, such as those contained in the full contents of buffers 204, can be maintained in buffer/cache structure 210 upon termination of the present read operation.

Data for new read requests may be supplied from the memory array, and/or from the cache. As discussed above, this data may essentially pass through buffers 204 prior to being output from the memory device. Also, the number of dummy cycles for commands that "hit" in the cache memory may be reduced. Further, one way of notifying the host that the data is ready much faster can be to use the DS signal, which can also act as an indication of data availability. In this way, the host would not have to count dummy cycles, and instead can wait for DS to toggle as an indication that the first data item is ready. In any event, DS can be relied on not just for clocking the data, but also for determining that the data from the memory device is ready. Thus, the host can also utilize DS as a flow-control signal to control pulling the data out by determining a data ready state, as part of its state machine functionality. For example, a state machine in the host may count dummy cycles, etc., so as to determine whether data is available for read out from the buffer, and to begin collecting the data from the memory device when available. Accordingly, in certain embodiments, DS can be used to clock data out, as well as to provide a data ready indicator to the host.

Control of the DS pin can also be utilized in support of informing the host that the memory may need to pause the transmission of data over the I/O lines. This may be needed when the memory might require extra latency due to "housekeeping" functions or any other reason. In certain embodiments, DS can be utilized as a "back-pressure mechanism" or "flow-control mechanism" to inform the host when more time is needed, such as may be accommodated by dummy cycles or other predefined wait states. For example, DS may stop toggling when waiting for data to be fetched from the memory array, may be driven to a constant value upon completion of the address phase, and can begin toggling when the first data is ready to be output from the memory device.

In any event, the host can utilize DS (or SCK) toggling in order to clock the data in to receive in the host device. Further, in cases whereby the burst of data may not be maintained after the first batch of data (e.g., due to wrap-around fetching), the DS can be frozen until the memory device "recovers" from the wrap-around operation, and can then again stream data. In wrap-around fetching, the "consecutively addressed" bytes of data can wrap-around from a highest addressed byte to a lowest addressed byte within a given data line. It should be noted that on a memory device whereby the number of sense amplifiers activated for a given memory array access matches the bus throughput, this "freeze" may happen only once (e.g., after sending the first batch of data), and the probability of such a freeze is relatively low in sequential read cases. However, this probability may be somewhat higher in reads that support wrap-around functionality, and depending on the cache line size. Further, if a DRAM is used in the memory implementation, the pause may be required for handling refresh operations, as just one example.

Also in particular embodiments, variable DS functionality/timing can allow for the memory device to re-read data in case of read errors, which can potentially increase the maximum operating frequency. This is as opposed to operating, e.g., a flash memory device at a frequency level that essentially guarantees no such data errors. Instead, the frequency can be allowed to go higher so long as the gains from such a frequency increase are higher than time that may be lost in processing any re-reads. In order to detect and correct read errors, or other errors, such as due to defective cells or radiation effects, re-read functionality and error-correcting code (ECC) can be employed. An alternative to increasing read speed is to decrease read current, such as for devices that are not running at maximum speed. For example, this can be done by using a lower read current, or by using shorter read pulses at a lower clock speed. In this case, the variable DS can be utilized to reduce overall power consumption for reads at such relatively low speeds.

In one embodiment, a method of controlling a memory device having a memory array with a plurality of memory cells arranged as a plurality of data lines, and a cache memory having first and second buffers and being configured to store a plurality of data lines, where each data line includes a predetermined number of bytes of data, can include: (i) receiving, by an interface, a first read command requesting a plurality of bytes of data in a consecutively addressed order from an address of a starting byte; (ii) storing, in the first buffer, a first of the plurality of data lines from the cache memory or the memory array, where the first data line includes the starting byte; (iii) storing, in the second buffer, a second of the plurality of data lines from the cache memory or the memory array, where the second data line is consecutively addressed with respect to the first data line; (iv) accessing, by output circuitry, data from the first buffer, and sequentially outputting each byte from the starting byte through a highest addressed byte of the first data line; (v) accessing, by the output circuitry, data from the second buffer, and sequentially outputting each byte from a lowest addressed byte of the second data line until the requested plurality of bytes of data has been output in order to execute the first read command; and (vi) maintaining the contents of the first and second buffers in the cache memory.

Figure 8:
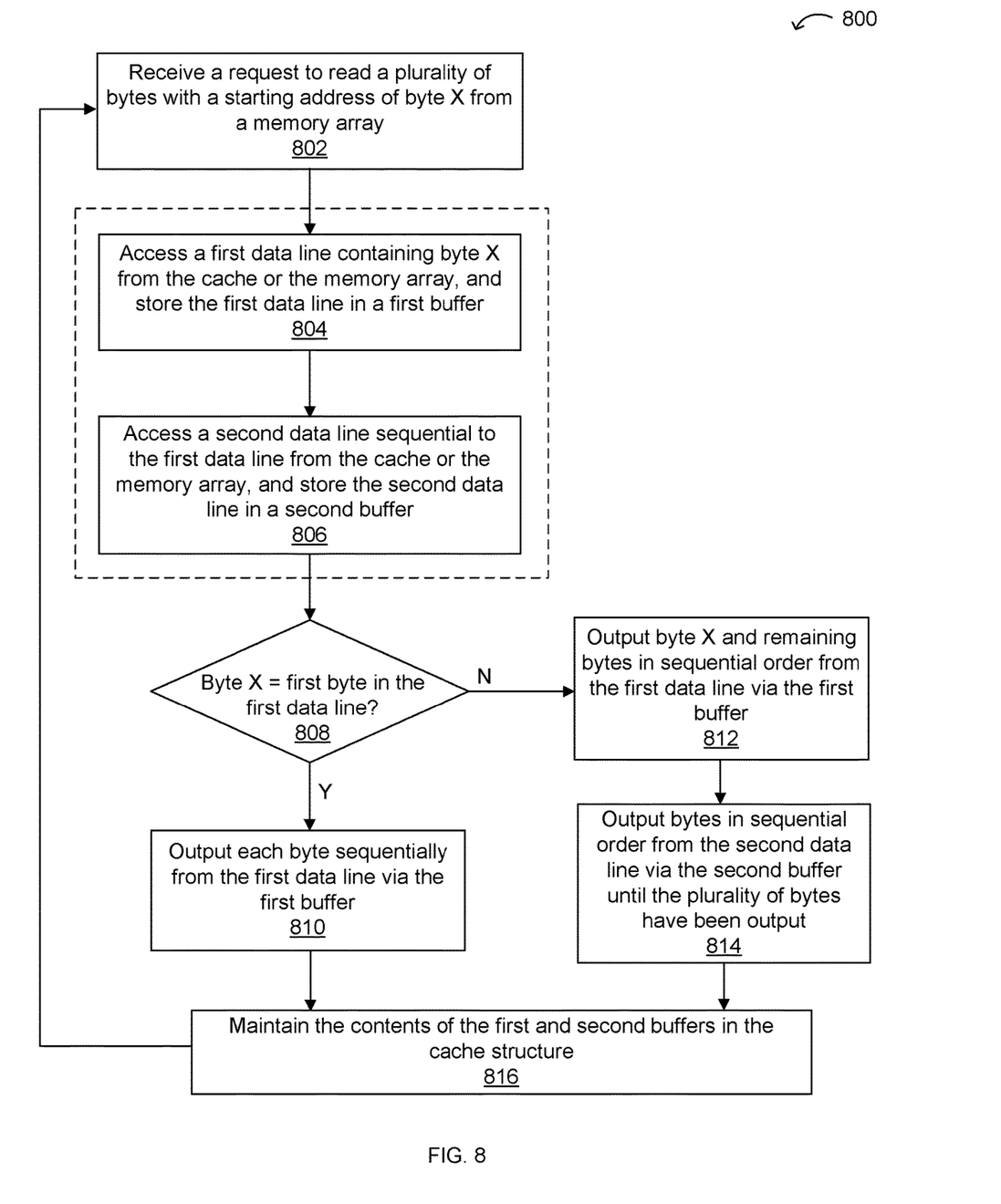
FIG. 8 is a flow diagram of an example method of reading bytes of data from a memory array, in accordance with embodiments of the present invention.

Referring now to FIG. 8, shown is a flow diagram 800 of an example method of reading bytes of data from a memory array, in accordance with embodiments of the present invention. At 802, a read request can be received to read a plurality of bytes (e.g., equal to a data line size, less or more than a data line size) with a starting address of byte X from a memory array (e.g., 202). At 804, a first data line containing byte X can be accessed from either the cache memory (e.g., 210) or the memory array (e.g., 202), and may be stored in a buffer (e.g., 204-0). For example, buffers 204 can be included in the cache memory structure. At 806, a second data line that is sequential (e.g., adjacent, consecutively addressed) to the first data line, can be accessed from the cache memory or memory array, and stored in another buffer (e.g., 204-1). As discussed above, whether the data is retrieved from the cache memory or the memory array can be based on a match or a mismatch of a comparison of the starting address against addresses stored in or associated with buffer/cache structure 210.

If, at 808, byte X is the first byte or the lowest addressed byte of the first data line, only the first data buffer (e.g., 204-0) need be utilized in order to satisfy the read request. In this case, at 810, each byte can sequentially be output from this first data line via the first buffer, in order to satisfy the read request. One example of such a case is shown in FIG. 6. As also shown, the data strobe can be triggered consistent with data being output from the memory device, in order to notify the host that the requested data is ready, and to provide a clock with timing sufficient to receive/clock this data in the host.

If at 808, byte X is not the first lowest addressed byte of the first data line, then the data required to fulfill the read request may be pulled from across a data line boundary, and thus two data lines need be accessed from cache memory 208 or memory array 202. In this case, at 812, byte X and remaining bytes in sequential order can be output from the first data line via the first buffer (see, e.g., 652 of FIG. 7). At 814, bytes can be output sequential order from the second data line via the second buffer (e.g., 204-1) until the plurality of bytes (e.g., a data line size) have been output from the memory device in order to satisfy the read request (see, e.g., 654 of FIG. 7). In addition, at 816, the contents of the first and second buffers can be maintained in the cache structure, such as by being copied into the cache memory (e.g., 208), or by being stored in one or more of buffers 204 that may be configured to form a cache structure (e.g., 210). In this way, read latency can be reduced for subsequent read operations that can access the requested data from cache structure 210.

Particular embodiments may also support options to operate on other byte boundaries (e.g., 2, 4, 8, etc.), which can allow for interface performance increases in some cases. Also, in order to accommodate higher interface frequencies, particular embodiments may support differential input (e.g., SCK) and output (e.g., DS) clocks, such as with an external reference voltage. Additionally, or alternatively, a synchronous data transfer can involve options as to specifying a number of dummy cycles, which may define the earliest time the data may be returned to the host. However, if the controller (e.g., host/CPU 102) is able to handle the data immediately, this value may remain at the minimum setting, and the memory device may output data as fast as possible.

When receiving data, the host controller may count incoming DS pulses, continue clocking until it has received as many DS clocks as desired, and may no longer rely on counting the SCK clocks generated by the host. For example, a minimum number of wait states can be set in a register, such as a mode byte for specifying minimum dummy cycles. The host can also stop the outgoing SCK for a number of cycles in order to give itself time to prepare for the arriving data. In one case, the minimum number of dummy cycles may be 0, if operating at a relatively low frequency. In a variable setting, the read commands may have 0 wait states up to a certain frequency, and one or more dummy cycles after that, in some cases.

Particular embodiments may also support, e.g., serial PSRAM applications, whereby the data line size is equal to the buffer size (e.g., 1024 bytes, or a multiple thereof). For example, a read operation from memory array 202 can bring 1024 bytes or more into a buffer 204. In this case, a typical single SPI burst may transfer 16 or 32 bytes of data to the bus via I/O interface 206, and the remaining data stored in the given buffer 204 could effectively be cached for later usage. Thus, portions of a given data buffer 204 can provide a cache-like function for subsequent read operations.

While the above examples include circuit, operational, and structural implementations of certain memory devices, one skilled in the art will recognize that other technologies and/or arrangements can be used in accordance with embodiments. Further, one skilled in the art will recognize that other device circuit arrangements, architectures, elements, and the like, may also be used in accordance with embodiments. In addition, other interfaces (e.g., parallel interfaces), signals, etc., may also be employed in certain embodiments.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A memory device, comprising:
   a) a memory array comprising a plurality of memory cells arranged as a plurality of data lines, wherein each data line comprises a predetermined number of bytes of data, and wherein memory cells in each data line share a common word line and selected bank of sense amplifiers to support access from the memory array in one memory access cycle;
   b) an interface configured to receive a first read command from a first CPU core, and that requests a plurality of bytes of data in a consecutively addressed order from an address of a starting byte;
   c) a cache memory comprising first and second buffers, and being configured to store a plurality of data lines;

d) the first buffer being configured to store a first of the plurality of data lines from the cache memory or the memory array, wherein the first data line comprises the starting byte;

e) the second buffer being configured to store a second of the plurality of data lines from the cache memory or the memory array, wherein the second data line is consecutively addressed with respect to the first data line;

f) output circuitry configured to access data from the first buffer, and to sequentially output each byte from the starting byte through a highest addressed byte of the first data line; and g) the output circuitry being configured to access data from the second buffer, and to sequentially output each byte from a lowest addressed byte of the second data line until the requested plurality of bytes of data has been output in order to execute the first read command, wherein the contents of the first and second buffers are maintained in the cache memory in response to a second read command being received on the interface from a second CPU core.

2. The memory device of claim 1, further comprising a data strobe driver configured to clock each byte of data output from the memory device by a data strobe on the interface, wherein the data strobe is configured to provide a data availability indication to a host.

3. The memory device of claim 1, wherein the second read command is for a non-sequential memory request.

4. The memory device of claim 1, wherein the first and second read commands are interleaved.

5. The memory device of claim 1, wherein the contents of the first and second buffers are maintained in the cache memory upon completion of the execution of the first read command.

6. The memory device of claim 1, wherein:
a) the memory array comprises non-volatile memory; and
b) the interface comprises a serial interface.

7. The memory device of claim 1, wherein the cache memory is configured to store a plurality of addresses that correspond each data line stored therein.

8. The memory device of claim 7, wherein the first buffer provides the first data line from the cache memory in response to a match of one of the plurality of addresses to the address of the starting byte.

9. The memory device of claim 7, wherein the second buffer provides the second data line from the cache memory in response to a match of one of the plurality of addresses to the address of the starting byte.

10. The memory device of claim 1, wherein an oldest of the plurality of data lines is replaced in the cache memory in response to the contents of the first and second buffers being maintained in the cache memory.

11. A memory system, comprising the memory device of claim 1, and further comprising a plurality of CPU cores coupled to the memory device via the interface, wherein the plurality of CPU cores comprises the first and second CPU cores.

12. A method of controlling a memory device having a memory array comprising a plurality of memory cells arranged as a plurality of data lines, and a cache memory having first and second buffers and being configured to store a plurality of data lines, wherein each data line comprises a predetermined number of bytes of data, the method comprising:

a) receiving, by an interface from a first CPU core, a first read command requesting a plurality of bytes of data in a consecutively addressed order from an address of a starting byte, wherein memory cells in each data line share a common word line and selected bank of sense amplifiers to support access from the memory array in one memory access cycle;

b) storing, in the first buffer, a first of the plurality of data lines from the cache memory or the memory array, wherein the first data line comprises the starting byte;

c) storing, in the second buffer, a second of the plurality of data lines from the cache memory or the memory array, wherein the second data line is consecutively addressed with respect to the first data line;

d) accessing, by output circuitry, data from the first buffer, and sequentially outputting each byte from the starting byte through a highest addressed byte of the first data line;

e) accessing, by the output circuitry, data from the second buffer, and sequentially outputting each byte from a lowest addressed byte of the second data line until the requested plurality of bytes of data has been output in order to execute the first read command; and f) maintaining the contents of the first and second buffers in the cache memory in response to a second read command being received on the interface from a second CPU core.

13. The method of claim 12, further comprising clocking each byte of data out from the memory device by a data strobe on the interface, wherein the data strobe is configured to provide a data availability indication to a host.

14. The method of claim 12, wherein the second read command is for a non-sequential memory request.

15. The method of claim 12, wherein the first and second read commands are interleaved.

16. The method of claim 12, wherein the maintaining the contents of the first and second buffers in the cache memory occurs upon completion of the execution of the first read command.

17. The method of claim 12, further comprising storing, in the cache memory, a plurality of addresses that correspond each data line stored therein.

18. The method of claim 17, further comprising:
a) comparing the address of the starting byte against the plurality of addresses to determine a match indication; and
b) providing, by the first buffer, the first data line from the cache memory in response to the match indication.

19. The method of claim 17, further comprising:
a) comparing the address of the starting byte against the plurality of addresses to determine a match indication; and
b) providing, by the second buffer, the second data line from the cache memory in response to the match indication.

20. The method of claim 12, further comprising replacing an oldest of the plurality of data lines in the cache memory in response to the contents of the first and second buffers being maintained in the cache memory.

* * * * *